Patented Mar. 26, 1940

2,194,468

UNITED STATES PATENT OFFICE 2,194,468

CONDENSATION PRODUCT AND PROCESS FOR MANUFACTURING THE SAME

Roger Fischer, Geneva, Switzerland

No Drawing. Application July 8, 1938, Serial No. 218,178. In Switzerland September 30, 1937

14 Claims. (Cl. 260—237)

The invention relates to new chemical compounds and to a process of their manufacture.

The new products are characterized in that they are products of condensation of alicyclic acids containing 5 to 10 carbon atoms, tertiary aliphatic amines and aliphatic polyoxyacids with 6 carbon atoms. They are to be used for the preservation of human or animal blood destined for transfusions and will keep the blood fresh and efficient over a longer period of time than has been known hitherto.

Among these products the most interesting are those which contain one gramme-molecule of the alicyclic acid, two gramme-molecules of the tertiary aliphatic amine and one gramme-molecule of the aliphatic polyoxyacid, although other molecular proportions of the constituents are possible.

The preferred alicyclic acid is camphoric-acid, 1.2.2-trimethyl-cis-cyclo-pentane-dicarboxylic-acid-(1.3).

Among the tertiary amines, trimethylamine and hexamethylene-tetramine are of special value.

The aliphatic polyoxy-acids may contain one or more carboxylic groups and are preferably prepared by oxydation of hexoses or polysaccharides.

These acids are for example gluconic acid, galactonic acid, glycuronic acid, saccharic acid, mannonic acid, gulonic acid, talonic acid, idonic acid and similar compounds.

One of the preferred products consists of 1 gramme-molecule camphoric acid, 2 gramme-molecules of hexamethylene tetramine, 1 gramme-molecule of gulconic- or galactonic acid. The compound with gluconic acid possesses a melting point of 160–165° C. whereas the compound with galactonic acid melts at about 240° C. under decomposition.

The new compounds are soluble in water and chloroform and can be readily transformed into the corresponding salts with alkali or alkaline earths. This transformation may be effected with calcium carbonate or calcium hydroxide to obtain the salts of calcium. Obviously with the same result the hydroxydes or carbonates of other alkali metals or alkaline earths may be used.

The process of preparing the aforementioned new compounds is characterized in that an alicyclic acid containing 5–10 carbon atoms, a tertiary aliphatic amine and an aliphatic polyoxy acid with 6 carbon atoms are caused to react together preferably in the presence of a diluent as for example acetone or methyl ethyl ketone by heating under pressure or with reflux. The final product may then be obtained from the reaction mixture by evaporating the diluting agent or by extraction with chloroform or water.

The invention will be described by the following examples without restricting it thereto.

Examples (1) 200 g. 1.2.2-trimethyl-cis-cyclopentanedicarboxylic-acid-(1.3), 280 g. hexamethylenetetramine and 196 g. gluconic acid are heated in the presence of methyl-ethyl-ketone under reflux. Then the diluting agent is distilled off and the condensation product of the three components isolated.

It forms white crystals with a melting point of 160–165° C.

By treating the compound with calcium carbonate it is readily transformed into the corresponding salt.

(2) 200 g. 1.2.2-trimethyl-cis-cyclopentanedicarboxylic acid-(1.3), 280 g. hexamethylenetetramine and 196 g. galactonic acid are heated under pressure in the presence of acetone. The product of condensation is isolated by evaporation of the acetone. It forms white crystals with a melting point of 240° C. under decomposition.

In the above examples instead of gluconic or galactonic acid the same portion of mannonic, gulonic, talonic or idonic acid may be employed. These acids may also be substituted by equivalent portions of glycuronic or saccharic acid.

While I have described my invention in detail according to the preferred products and the preferred means of carrying out the process and producing the product, it will be obvious to those skilled in the art after understanding my invention, that changes and modifications may be made therein without departing from the spirit or scope of my invention and I aim in the appending claims to cover all such changes and modifications.

What I claim is:

1. As a new chemical compound the product of condensation from 1.2.2-trimethyle-cis-cyclopentane-dicarboxylic-acid-(1.3), a tertiary aliphatic amine and an aliphatic polyoxy carboxylic acid with 6 carbon atoms.

2. As a new chemical compound the product of condensation from 1 gramme-molecule of 1.2.2-trimethyle-cis-cyclopentane-dicarboxylic-acid-(1.3), 2 gramme-molecules of a tertiary aliphatic amine and 1 gramme-molecule of an aliphatic polyoxy carboxylic acid with 6 carbon atoms.

3. As a new chemical compound the product of condensation from 1.2.2-trimethyle-cis-cyclopentane-dicarboxylic-acid-(1.3), hexamethylenetetramine and an aliphatic polyoxy carboxylic acid with 6 carbon atoms.

4. As a new chemical compound the product of condensation from 1 gramme-molecule of 1.2.2-trimethyle-cis-cyclopentane-dicarboxylic-acid-(1.3), 2 gramme-molecules of hexamethylenetetramine and 1 gramme molecule of an aliphatic polyoxy carboxylic acid with 6 carbon atoms.

5. As a new chemical compound the product of condensation from 1 gramme-molecule of 1.2.2-trimethyle-cis-cyclopentane-dicarboxylic-acid-(1.3), 2 gramme-molecules of hexamethylenetetramine and 1 gramme-molecule of gluconic acid.

6. As a new chemical compound the product of condensation from 1 gramme-molecule of 1.2.2-trimethyle-cis-cyclopentane-dicarboxylic-acid-(1.3), 2 gramme-molecules of hexamethylenetetramine and 1 gramme-molecule of galactonic acid.

7. The process of preparing new chemical compounds by condensation of 1.2.2-trimethyle-cis-cyclopentane-dicarboxylic-acid-(1.3) with a tertiary aliphatic amine and an aliphatic polyoxy carboxylic acid with 6 carbon atoms.

8. The process of preparing new chemical compounds by condensing 1 gramme-molecule of 1.2.2-trimethyle-cis-cyclopentane-dicarboxylic-acid-(1.3), 2 gramme-molecules of a tertiary aliphatic amine and 1 gramme-molecule of an aliphatic polyoxy carboxylic acid with 6 carbon atoms.

9. The process of preparing new chemical compounds by condensing 1.2.2-trimethyle-cis-cyclopentane-dicarboxylic-acid-(1.3), hexamethylenetetramine and an aliphatic polyoxy carboxylic acid with 6 carbon atoms.

10. The process of preparing a new chemical compound by condensing 1 gramme-molecule of 1.2.2-trimethyle-cis-cyclopentane-dicarboxylic-acid-(1.3), 2 gramme-molecules of hexamethylenetetramine and 1 gramme molecule of an aliphatic polyoxy carboxylic acid.

11. The process of preparing a new chemical compound by condensation of one gramme-molecule of 1.2.2-trimethyle-cis-cyclopentane-dicarboxylic acid-(1.3), 2 gramme-molecules of hexamethylenetetramine and 1 gramme-molecule gluconic acid.

12. The process of preparing new chemical compounds by condensation of 1.2.2-trimethyle-cis-cyclopentane-dicarboxylic-acid-(1.3) with a tertiary aliphatic amine and an aliphatic polyoxy carboxylic acid with 6 carbon atoms and transforming the product of condensation into a metal salt.

13. The process of preparing new chemical compounds by condensation of 1.2.2-trimethyle-cis-cyclopentane-dicarboxylic-acid-(1.3) with a tertiary aliphatic amine and an aliphatic polyoxy carboxylic acid with 6 carbon atoms and transforming the product of condensation into an alkaline earth metal salt.

14. The process of preparing new chemical compounds by condensation of 1.2.2-trimethyle-cis-cyclopentane-dicarboxylic-acid-(1.3) with a tertiary aliphatic amine and an aliphatic polyoxy carboxylic acid with 6 carbon atoms and transforming the product of condensation into the calcium salt.

ROGER FISCHER.